United States Patent [19]
Sugawara

[11] Patent Number: 5,838,508
[45] Date of Patent: Nov. 17, 1998

[54] COLOR FILTER AND PROCESS FOR FABRICATING THE SAME AND ELECTRO-OPTICAL DEVICE

[75] Inventor: Akira Sugawara, Kanagawa, Japan

[73] Assignee: Semiconductor Energy Laboratory Co., Ltd., Kanagawa-ken, Japan

[21] Appl. No.: 701,546

[22] Filed: Aug. 22, 1996

Related U.S. Application Data

[63] Continuation of Ser. No. 217,173, Mar. 24, 1994, abandoned.

[30] Foreign Application Priority Data

Mar. 26, 1993 [JP] Japan .................................... 5-092605

[51] Int. Cl.⁶ ................................ G02B 5/22; F21V 9/04; F21V 9/06
[52] U.S. Cl. .......................... 359/890; 359/885; 359/359; 359/361
[58] Field of Search .................................... 359/885, 359, 359/360, 361, 585, 66, 67, 68, 890; 430/7, 14, 18

[56] References Cited

U.S. PATENT DOCUMENTS

| | | | |
|---|---|---|---|
| 3,585,381 | 6/1971 | Hodsen | 250/47 |
| 4,597,637 | 7/1986 | Ohta | 359/68 |
| 4,745,327 | 5/1988 | Saeki | 359/885 |
| 4,779,957 | 10/1988 | Suginoya | 359/68 |
| 4,786,148 | 11/1988 | Sekimura et al. | 349/106 |
| 4,953,952 | 9/1990 | Okumura | 359/68 |
| 5,056,895 | 10/1991 | Kahn | 359/87 |
| 5,157,527 | 10/1992 | De Keyzer | 359/66 |
| 5,166,126 | 11/1992 | Harrison | 503/227 |
| 5,185,059 | 2/1993 | Nishida | 156/659.1 |
| 5,232,634 | 8/1993 | Sawada | 252/584 |
| 5,236,793 | 8/1993 | Nishiwaki | 430/20 |
| 5,246,804 | 9/1993 | Furukawa | 430/20 |
| 5,278,009 | 1/1994 | Iida | 359/885 |
| 5,367,393 | 11/1994 | Ohara | 359/67 |
| 5,400,157 | 3/1995 | Won | 359/67 |
| 5,464,714 | 11/1995 | Watanabe | 430/7 |
| 5,556,737 | 9/1996 | Nakamura | 430/400 |

FOREIGN PATENT DOCUMENTS

| | | | |
|---|---|---|---|
| 63-83703 | 4/1988 | Japan | 359/361 |
| 404012301 | 1/1992 | Japan | 359/66 |

OTHER PUBLICATIONS

IBM Technical Disclosure, Ultraviolet Protecting Coating, Oct. 1972, vol. 15, No. 2, pp. 584–585.

*Primary Examiner*—Georgia Y. Epps
*Assistant Examiner*—Ricky Mack
*Attorney, Agent, or Firm*—Sixbey, Friedman, Leedom & Ferguson; Gerald J. Ferguson, Jr.

[57] ABSTRACT

A color filter comprising a substrate having thereon a layered structure comprising from the substrate side in this order, a color filter layer, a smoothing layer, a protective layer having a high reflectance and low absorptivity of laser beam, and a transparent electrically conductive layer. Also claimed is a process for fabricating the same and a color liquid crystal display device using the same.

20 Claims, 6 Drawing Sheets

COLOR FILTER AND PROCESS FOR FABRICATING THE SAME AND ELECTRO-OPTICAL DEVICE

This application is a Continuation of Ser. No. 08/217,173, filed Mar. 24, 1994, now abandoned.

BACKGROUND OF THE INVENTION

1. Field of the Invention

The present invention relates to a color filter and a process for fabricating the same. More particularly, the process comprises patterning a transparent electrically conductive layer formed on a color filter by using a laser beam. The color filter thus obtained is used widely in the field of color liquid crystal displays.

2. Prior Art

Because color liquid crystal displays are compact, lightweight, and operate with low power consumption, they are used as thin displays to replace the present day display devices such as television receivers using cathode ray tubes (CRTs). In particular, advance in technology can be found especially in TN (twisted nematic) liquid crystals and STN (super twisted nematic) liquid crystals, and those liquid crystals are widely used in the field of word processors, projectors, and liquid crystal television receivers.

However, there are yet many problems to be overcome in increasing the yield of the color filters employed in the color liquid crystal displays. Accordingly, the color filters are still too expensive. For instance, a single matrix liquid crystal display requires the use of an electrode processed into a fine wire in correspondence with the color filter, thereby demanding a high skill in processing. A process for fabricating a color filter with high yield has therefore been awaited.

Referring to FIG. 3, a prior art color filter substrate for use in color liquid crystal comprises a glass substrate 1 formed thereon a color filter layer 2 consisting of a red (R)-colored layer 2-1, a green (G)-colored layer 2—2, a blue (B)-colored layer 2-3, and a black (BL) matrix 2-4. The color filter layer 2 has further thereon a smoothing layer 3 and a transparent electrically conductive layer 5. The transparent electrically conductive layer 5 is patterned by photolithography to establish electrodes each corresponding to colors R (red), G (green), and B (blue).

As described in the foregoing, the smoothing layer of a color filter substrate fabricated in accordance with the prior art process cannot be formed so uniformly due to the difficulties associated with the coating method and the thickness of the film. It then follows that an ultraviolet radiation having a non-uniform intensity is irradiated upon photolithographic patterning of the transparent layer 5 formed on the smoothing layer 3. This results in a processed edge portion having a blunt edge due to the presence of irregularities on the color filter. That is, the ultraviolet radiation fails to have a uniform intensity when applied to the resist. If the processed edge has too blunt an edge, serious problems such as short circuit occur along the transverse direction. When deep etching is performed to prevent short circuit from occurring, on the other hand, the area of the driver electrode portion reduces as to increase the interconnection resistance and decrease the aperture ratio. Furthermore, due to the decrease in the area of the electrode which results in an electrode area smaller than that of the pixel portion expected for the color filter, discoloring and other problems occur to further lower the product yield.

The smoothing layer is made of a resin such as polyimide. The resin has poor adhesion strength when applied to a transparent electrically conductive material such as an ITO (indium tin oxide), because there occurs a large difference in stress between the resin and a transparent electrically conductive material. In the case of patterning using a resist, solutions used in the steps of development, etching, and peeling off tend to remain between the resin and the electrodes. The transparent electrically conductive layer easily falls off in such cases to yield patterns having poor appearance.

The aforementioned problems of transverse short circuit, small aperture ratio, and poor image resolution can be overcome by processing using a laser beam having a focus depth longer than the height of the irregularities of the plane to be irradiated. This method, however, tends to form deep grooves in the smoothing layer during processing the transparent electrically conductive layer.

The problem of engraving deep grooves in the smoothing layer is attributed to the fact that the smoothing layer is more apt to absorb the laser beam than the transparent electrically conductive layer, and that the smoothing layer has a melting point and a boiling point lower than those of the transparent electrically conductive layer. This leads to the formation of an orientation film having a great fluctuation in thickness in the subsequent step. Furthermore, the presence of a transparent electrically conductive layer greatly increases the step height to unfavorably provide orientation defects such as disclination.

SUMMARY OF THE INVENTION

In the light of the aforementioned circumstances, the present inventors have extensively studied the above problems to clarify the mechanism of causing such problems. The present invention has been accomplished as a result of such extensive studies. Referring to FIG. 1, the present invention provides a color filter comprising a transparent substrate 1 having thereon in this order from the substrate side, an RGB-BL color filter layer 2, a smoothing layer 3 made of a resin for smoothing the upper surface of the filter layer, a protective layer 4 to protect the layers from a laser beam, and a transparent electrically conductive layer 5.

The present invention also provides a process for forming a color filter, which comprises: forming an RGB-BL color filter layer 2 on a transparent substrate 1; forming a smoothing layer to smooth the surface of the filter 2; forming a protective layer 4 on the smoothing layer to protect it against a laser beam; providing a transparent electrically conductive layer 5 on the surface of the protective layer; and irradiating a laser beam to partially remove the transparent electrically conductive layer 5, thereby preventing the formation of undesirable grooves.

DETAILED DESCRIPTION OF THE PRESENT INVENTION

Figure 1:
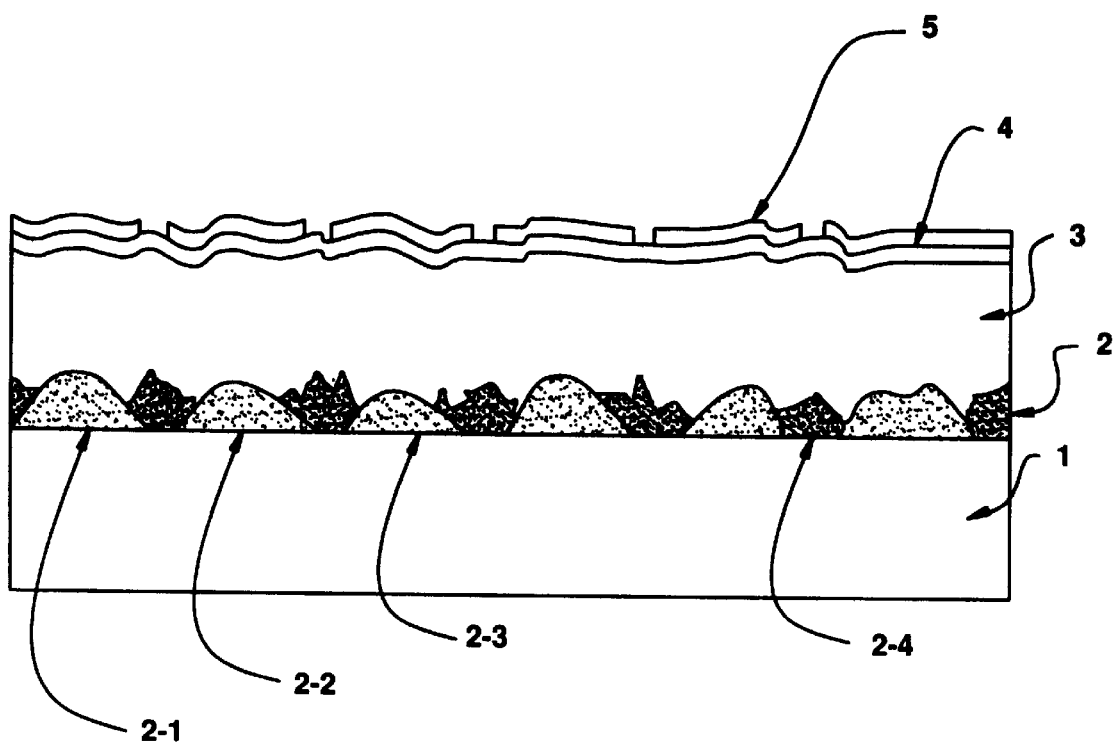
FIG. 1 is a schematic cross section view of a color filter substrate obtained by a process according to an embodiment of the present invention.

In the process according to the present invention, the transparent electrically conductive layer is processed using a laser emitting a ultraviolet light in the wavelength range of from 100 to 400 nm; more specifically, a KrF excimer laser. The laser radiation irradiated to the surface of the transparent electrically conductive film to be processed liquefies and evaporates the transparent electrically conductive film. Because this process of melting and gasification occurs instantaneously, the layer to be formed under the transparent electrically conductive layer is preferably made of a material having a heat resistance higher than that of the transparent electrically conductive layer.

Since the process according to the present invention utilizes optical energy in addition to the heat, not only the temperature of processing but also the absorptivity of an optical energy must be considered. If the layer provided as a base absorbs too much light falling in the wavelength range of the light emitted by the laser used in the processing, the base layer also undergoes processing after laser processing the transparent electrically conductive layer. Thus, the material to be used in the base preferably has low absorptivity and a high reflectance for a light having a wavelength corresponding to that emitted from the laser.

The smoothing layer is made of a resin capable of producing a relatively thick film, such as polyimide, Nylon, poly(vinyl alcohol), and acrylic resin.

The protective layer is made of an inorganic oxide having a melting point or 1,000° C. or higher, such as $SiO_2$, $Al_2O_3$, $Ta_2O_5$, and $WO_2$, or a film made of a fluoride such as $MgF_2$ and $CaF_2$, having high reflectance and low absorptivity of an ultraviolet light. The material for use as the protective layer is not limited to those enumerated above, and any material can be used as long as the material has a heat resistance higher than that of the transparent electrically conductive layer and a low absorptivity of laser beam used in the processing.

The color filter according to the present invention comprises an inorganic film (protective layer) formed on an organic film (smoothing layer). These layers have poor adhesiveness between each other. Accordingly, a physical treatment is applied to the surface of the smoothing layer to activate the film, particularly, the surface thereof, to increase the adhesiveness. The physical treatment more specifically comprises, for example, plasma treatment, ultraviolet light irradiation, and corona discharge treatment. Other treatment having a similar effect may be used in the place of the specifically enumerated ones above.

The transparent electrically conductive layer for use in the color filter according to the present invention is made of a material such as ITO, $SnO_2$, and ZnO, but the material is not only limited thereto, and other materials which finally provide a transparent electrically conductive layer can be freely selected and used.

The process for fabricating a color filter according to the present invention is characterized in that the protective layer prevents the formation of undesired grooves in the smoothing layer by laser irradiation during the processing of the transparent electrically conductive layer. In this manner, the transparent electrically conductive layer alone is processed by laser irradiation.

Figure 2:
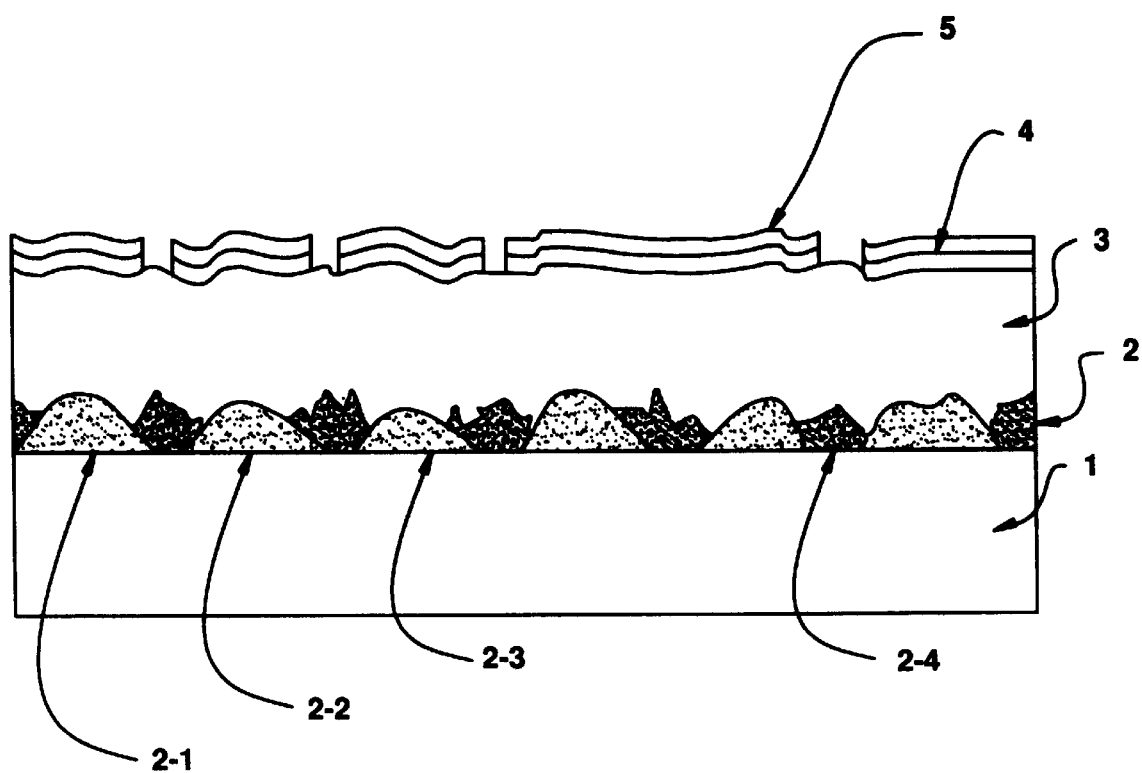
FIG. 2 is a schematic cross section view of a color filter substrate obtained by a process according to another embodiment of the present invention.
Figure 3:
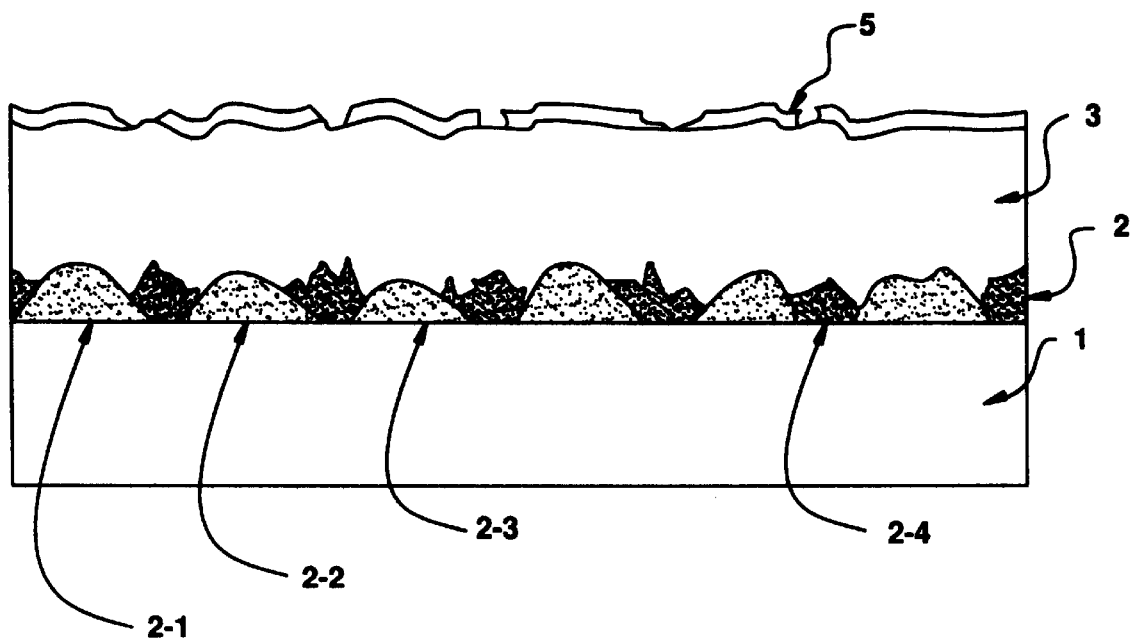
FIG. 3 is a schematic cross section view of a color filter substrate obtained by a prior art process.

Furthermore, as described above, a transparent electrically conductive layer made of a material having a high melting point and a high boiling point tend to leave residues upon processing with a laser beam. Accordingly, the laser processing of such a layer is limited to the vicinity of the protective layer having relatively high selectivity with respect to the smoothing layer upon laser processing, and the protective layer 4 and the residue are removed at the same time by acid treatment as shown in FIG. 2. In this manner, transverse short circuit can be prevented from occurring.

The present invention is illustrated in greater detail referring to non-limiting examples below. It should be understood, however, that the present invention is not to be construed as being limited thereto.

EXAMPLE 1

Referring to FIG. 1, a red-colored color filter layer 2-1 using a resin comprising polyimide dispersed therein a pigment was formed on a transparent substrate 1, and was patterned by photolithography. Then, a green-colored color filter layer 2—2 and a blue-colored color filter layer 2-3 were formed sequentially thereon in a manner similar to the process used in the case of forming the red-colored filter layer. Similarly, a black matrix 2-4 was formed to obtain a laminate of a color filter 2. Polyimide was applied to the surface of the color filter 2 by spin coating to provide a smoothing layer 3 for a thickness of 4 μm. After depositing an $SiO_2$ film by sputtering for a thickness of 0.1 μm as a protective layer 4, a 0.20 μm thick ITO film was deposited further thereon by sputtering to provide a transparent electrically conductive layer 5. The structure of the resulting substrate is shown in Table 1 as the layer structure No. 1.

Comparative Example 1

A substrate having no protective layer was fabricated. The substrate corresponds to the layer structure No. 4 in Table 1.

The substrates thus obtained in Example 1 and the Comparative Example 1 were cleaned, and subjected to linear laser scribing. A KrF excimer laser operating at a wavelength of 248 nm and a power density of 300 mJ/cm$^2$ was used to irradiate one shot per one line. The laser beam used in this case was processed through an optical system to have a width of 10 μm, a length of 300 mm, and a focus depth of 0.2 mm, so that the beam shape may sufficiently cover the size of the irregularities of the color filter, i.e., 500 nm. The laser beam scribes a length of 300 mm by a single irradiation.

Figure 4:
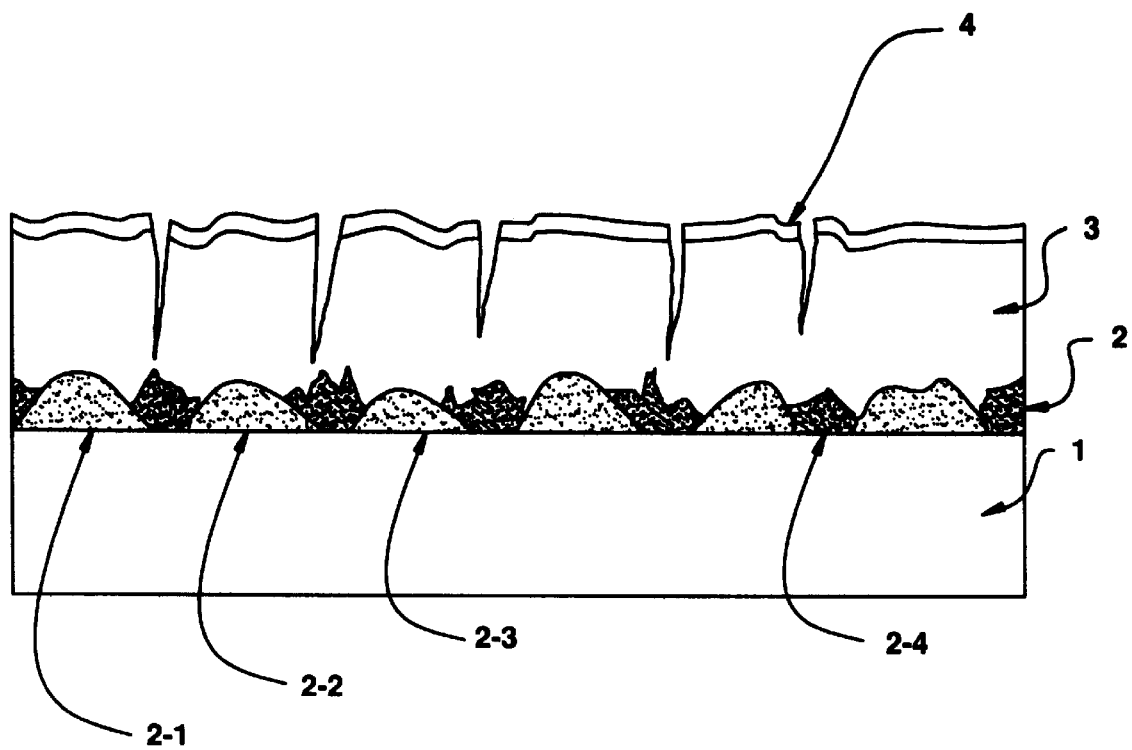
FIG. 4 is a schematic cross section view of a color filter substrate obtained by a comparative process.

The results are summarized below in Table 2. The layer structure No. 1 represents to the color filter substrate having thereon a protective layer, and the layer structure No. 4 represents the substrate having no protective layers. Each of the laser-scribed cross sections of the substrates was measured by means of a step meter and a cross section scanning electron microscopy (SEM). It can be seen from FIG. 4 that the substrate having thereon no protective layer had a deep cut into the polyimide layer 3 to a length of 2 μm or longer as to reach the black color filter layer.

In contrast to the case above, the groove in the substrate having thereon a protective layer was stopped at a depth of 0.20 μm corresponding to the thickness of the ITO film as shown in FIG. 1. The insulation resistance was sufficiently high as to yield a value of $1 \times 10^{11}$ Ω or higher.

Displays were fabricated using each of the substrates obtained according to Example 1 and Comparative Example 1. The display fabricated from the substrate having no protective layer thereon was found to be defective due to the generation of disclination and the like, however, the product obtained from the substrate having thereon a protective layer yielded favorable characteristics free of defects in the pixels. Similar results were obtained from the displays fabricated from substrates comprising a protective layer made from $Al_2O_3$, $WO_2$, $MgF_2$, or $CaF_2$.

EXAMPLE 2

A color filter layer was fabricated by an ordinary process, and a smoothing layer was provided thereon by spin-coating polyimide to a thickness of 4 μm. A tantalum film was deposited thereon by RF sputtering to a thickness of 0.10 μm, and was anodically oxidized to provide a light-transmitting oxide ($Ta_2O_5$) film as a protective layer. A transparent electrically conductive layer was provided thereon by depositing a 0.20 μm thick ITO film by sputtering. Thus was obtained a layer structure No. 3 as shown in Table 1.

Comparative Example 2

A substrate comprising a 0.4 μm thick poly(vinylidene fluoride) (referred to hereinafter simply as "p-VDF") film provided by spin coating was fabricated. The layer structure is shown in Table 1 as layer structure No. 5.

The substrates obtained in Example 2 and Comparative Example 2 were cleaned, and subjected to linear laser scribing. An ArF excimer laser operating at a wavelength of 293 nm and a power density of 150 mJ/cm² was used to irradiate two shots per one line. The laser beam used in this case was processed through an optical system to have a width of 5 μm, a length of 300 mm, and a focus depth of 0.2 mm, so that the beam shape may sufficiently cover the size of the irregularities of the color filter, i.e., 500 nm. The laser beam scribes a length of 300 mm by a single process (two shots).

Figure 5:
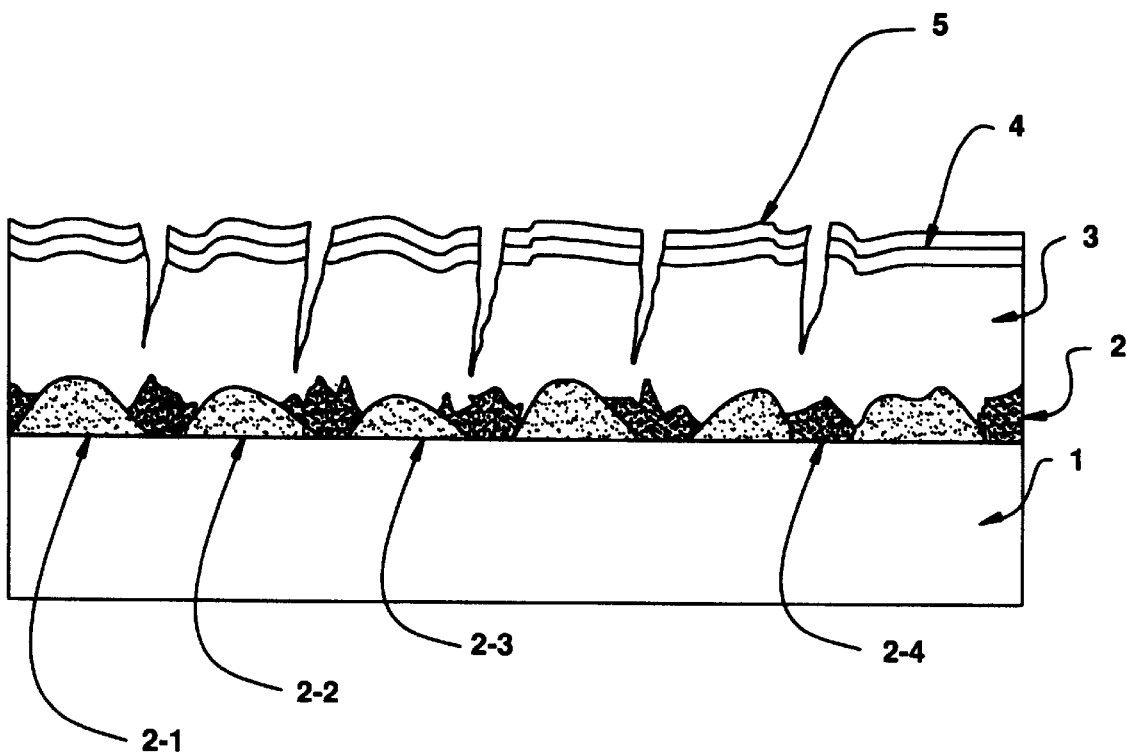
FIG. 5 is a schematic cross section view of a color filter substrate obtained by another comparative process.

The results are summarized below in Table 2. The layer structure 3 represents to the color filter substrate having thereon a $Ta_2O_5$ protective layer, and the layer structure No. 5 represents the substrate having a p-VDF protective layer. Each of the laser-scribed cross sections of the substrates was measured by means of a step meter and a cross section scanning electron microscopy (SEM). It can be seen from FIG. 5 that the substrate having thereon the p-VDF protective layer had a deep cut into the polyimide layer to a length of 1 μm or longer as to reach the black color filter layer. In contrast to the case above, the groove in the substrate having thereon the $Ta_2O_5$ protective layer was stopped at a depth of 0.20 μm corresponding to the thickness of the ITO film as shown in FIG. 1. The insulation resistance was sufficiently high as to yield a value of $1\times10^{11}$ Ω or higher.

Displays were fabricated using each of the substrates obtained according to Example 2 and Comparative Example 2. The display fabricated from the substrate having a p-VDF protective layer thereon was found to be defective due to the generation of disclination and the like, however, the product obtained from the substrate having thereon a $Ta_2O_5$ protective layer yielded favorable characteristics free of defects in the pixels.

EXAMPLE 3

A color filter layer was fabricated by an ordinary process, and a smoothing layer was provided thereon by spin-coating polyimide to a thickness of 4 μm. The surface of the smoothing layer was activated by irradiating a ultraviolet (UV) light using a high vapor pressure mercury lamp operated at a power of 20 mW/cm² for 2 minutes. An $SiO_2$ layer was formed by spin-coating at a thickness of 0.10 μm as a protective layer, and a 0.17 μm thick ZnO film was deposited further thereon as a transparent electrically conductive layer to obtain a structure corresponding to layer structure No. 2 in Table 1.

Comparative Example 3

A layer structure similar to that of Example 3 but not subjected to the activation of the smoothing layer was fabricated. The structure is given in Table 1 as layer structure No. 6.

The substrates thus obtained in Example 3 and the Comparative Example 3 were cleaned, and subjected to linear laser scribing. A KrF excimer laser operating at a wavelength of 248 nm and a power density of 300 mJ/cm² was used to irradiate one shot per one line. The laser beam used in this case was processed through an optical system to have a width of 10 μm, a length of 300 mm, and a focus depth of 0.2 mm, so that the beam shape may sufficiently cover the size of the irregularities of the color filter, i.e., 500 nm. The laser beam scribes a length of 300 mm by a single irradiation.

The results are summarized below in Table 2. The layer structure No. 2 represents to the color filter substrate whose smoothing layer was subjected to activation treatment, and the layer structure No. 6 represents the substrate whose smoothing layer was not subjected to activation treatment. Each of the laser-scribed cross sections of the substrates was measured by means of a step meter and a cross section scanning electron microscopy (SEM). It can be seen from FIG. 1 that the both substrates comprise a groove stopped by the protective layer, but the insulation resistance of the layer structure No. 6 was found to be insufficiently low as to yield a value of $1\times10^8$ Ω. This was attributed to the ZnO residue inside the groove.

Accordingly, the ZnO residue was removed by treating the protective film with hydrofluoric acid. Hydrofluoric acid used in this case was diluted to one tenth of the original concentration, and the substrate was dipped therein for a duration of 10 seconds.

The results are summarized below in Table 2. The layer structure No. 21 represents to the color filter substrate whose smoothing layer was subjected to activation treatment using UV radiation, and the layer structure No. 61 represents the substrate whose smoothing layer was not subjected to activation treatment. Each of the laser-scribed cross sections of the substrates after the acid treatment was measured by means of a step meter and a cross section scanning electron microscopy (SEM).

Figure 6:
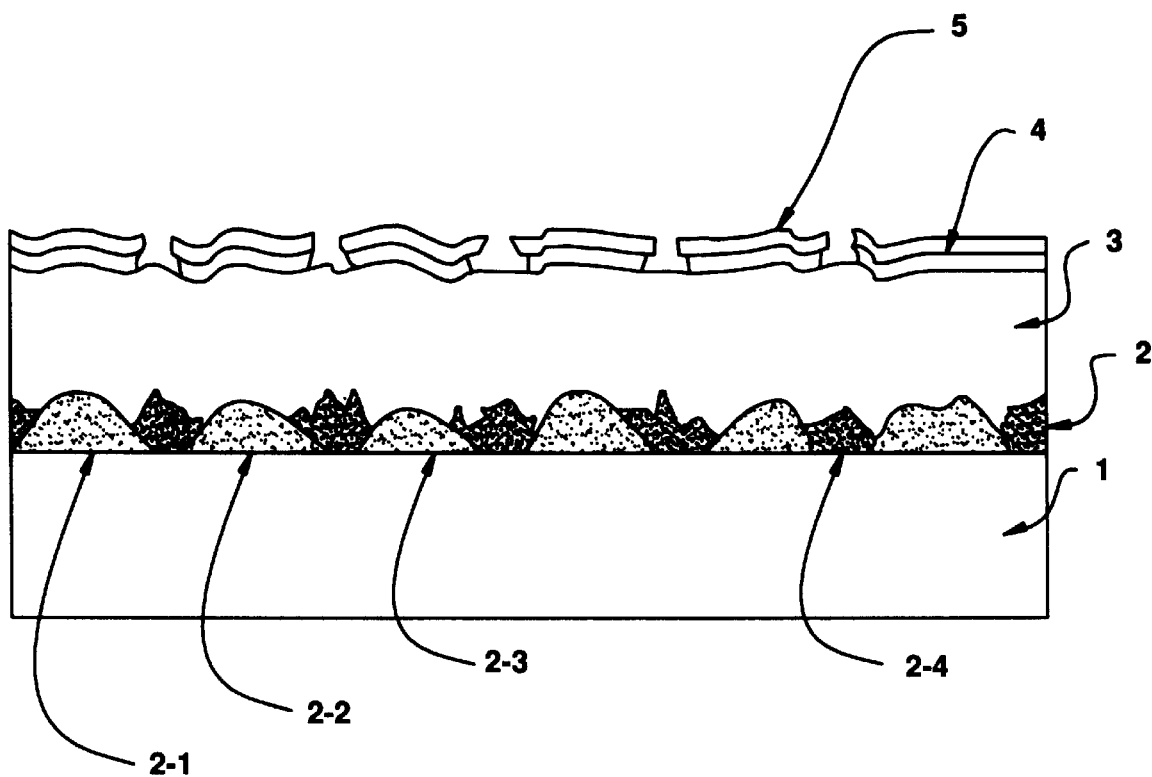
FIG. 6 is a schematic cross section view of a color filter substrate obtained by a further comparative process.

It can be seen from FIG. 2 that $SiO_2$ was clearly removed along the groove in the case of the substrate comprising a smoothing layer subjected to UV irradiation treatment, but that the groove width was increased for the substrate whose smoothing layer was not subjected to UV treatment. This can be seen in FIG. 6.

Displays were fabricated using each of the substrates obtained according to Example 3 and Comparative Example 3. The display fabricated from the substrate whose smoothing layer was not subjected to activation treatment was found defective due to the generation of voids. The display obtained from a substrate having a smoothing layer subjected to activation treatment, on the other hand, yielded favorable results free from any pixel defects. Treatments such as plasma treatment and corona discharge treatment can be applied to the smoothing layer as the activation treatment in the place of UV irradiation treatment.

TABLE 1

| Layer Structure | Smoothing Layer | Activation Treatment | Protective Layer | Conductive Layer |
| --- | --- | --- | --- | --- |
| No. 1 | polyimide | — | $SiO_2$ | ITO |
| No. 2 | polyimide | UV | $SiO_2$ | ZnO |
| No. 3 | polyimide | — | $Ta_2O_5$ | ITO |
| No. 4 | polyimide | — | — | ITO |
| No. 5 | polyimide | — | VDF | ITO |
| No. 6 | polyimide | — | $SiO_2$ | ZnO |

TABLE 2

| Layer Structure | Groove Depth ($\mu$m) | Groove Width ($\mu$m) | Insulation Resistance ($\Omega$) |
| --- | --- | --- | --- |
| No. 1 | 0.16 | 10 | $1 \times 10^{11}$ |
| No. 2 | 0.17 | 10 | $1 \times 10^{8}$ |
| No. 3 | 0.18 | 5 | $1 \times 10^{11}$ |
| No. 4 | 2.0 | 10 | $1 \times 10^{11}$ |
| No. 5 | 1.8 | 5 | $1 \times 10^{11}$ |
| No. 6 | 0.17 | 10 | $1 \times 10^{8}$ |
| No. 21 | 0.27 | 10 | $1 \times 10^{11}$ |
| No. 61 | 0.21 | 15 | $1 \times 10^{11}$ |

Thus was obtained a 640×3×480-pixel (921,600 pixels) full color 16-gradation display using a color filter according to the present invention, which can be operated in black-and-white mode by inserting two compensation sheets under the front polarization sheet. An orientation film subjected to rubbing at an angle of 240° and 50 nm in thickness was used. The cell employed in the display was 5.5 $\mu$m in thickness, and was charged with a Merck ZLI-2293 liquid crystal added therein S-811 as the chiral material. The duty ratio and the contrast ratio of the display was found to be 1:240 and 20, respectively.

As described in the foregoing, the present invention facilitates the fabrication of color filter substrates using laser processing, by previously forming a laser protective layer to protect the substrate against laser beams. Thus was implemented color displays having a high aperture ratio and at a high product yield. The color filter according to the present invention is useful for the industry, because the percent defective in the fabrication of color displays can be considerably lowered by employing the present invention.

While the invention has been described in detail and with reference to specific embodiments thereof, it will be apparent to one skilled in the art that various changes and modifications can be made therein without departing from the spirit and scope thereof.

What is claimed is:

1. A process for fabricating a color filter comprising:
   forming a color filter layer on a substrate;
   forming a smoothing layer on said color filter layer;
   forming a protective layer on said smoothing layer;
   forming a transparent electrically conductive layer on said protective layer; and
   patterning said transparent electrically conductive layer using a laser beam.

2. A process according to claim 1 wherein said smoothing layer comprises a material selected from the group consisting of polyimide, Nylon, poly(vinyl alcohol), and acrylic resin, and said protective layer comprises a material selected from the group consisting of silicon oxide, aluminum oxide, tungsten oxide, magnesium fluoride, and calcium fluoride.

3. A process according to claim 1 wherein said smoothing layer comprises polyimide, and said protective layer comprises tantalum oxide.

4. A process according to claim 1 wherein further comprising a step of activating a surface of said smoothing layer by a treatment selected from the group consisting of ultraviolet light irradiation, plasma treatment, and corona discharge treatment.

5. A process according to claim 4 wherein said protective layer forming step is carried out after said performing said treatment.

6. A process according to claim 1 wherein after patterning said transparent electrically conductive layer said protective layer is patterned by acid treatment using said transparent electrically conductive layer as a mask.

7. A process according to claim 1 wherein said laser beam is emitted from an eximer laser.

8. A method according to claim 1 wherein said substrate is a transparent substrate.

9. A method of manufacturing an electro-optical device comprising the steps of:
   forming a transparent organic resin film over a substrate to provide a leveled upper surface;
   forming a transparent inorganic film on said transparent organic resin film;
   forming a transparent conductive film on said transparent inorganic film; and
   patterning said transparent conductive film on said transparent inorganic film,
   wherein said method further comprises a step of activating a surface of said transparent organic resin film before the formation of said transparent inorganic film in order to increase the adhesivity therebetween.

10. A process according to claim 9 wherein said transparent organic resin film comprises a material selected from the group consisting of polyimide, Nylon, poly(vinyl alcohol) and acrylic resin.

11. A process according to claim 9 wherein said transparent inorganic film comprises a material selected from the group consisting of silicon oxide, aluminum oxide, tantalum oxide, tungsten oxide, magnesium fluoride, and calcium fluoride.

12. A process according to claim 9 wherein said activating step is carried out by using ultraviolet light irradiation.

13. A process according to claim 9 wherein said activating step is carried out by using a plasma treatment.

14. A process according to claim 9 wherein said activating step is carried out by using a corona discharge treatment.

15. A process according to claim 9 wherein said substrate has a color filter below said transparent organic resin film.

16. A method according to claim 9 wherein said substrate is a transparent substrate.

17. A method of manufacturing an electro-optical device comprising the steps of:
   forming a transparent organic resin film over a substrate to provide a leveled upper surface;
   treating the leveled upper surface with an ultraviolet light; and then
   forming a film on the leveled upper surface of said transparent organic region film.

18. A method according to claim 17 wherein said substrate is a transparent substrate.

19. A method according to claim 17 wherein said organic resin film comprises a material selected from the group consisting of polyimide, Nylon, poly(vinyl alcohol), and acrylic resin.

20. A process according to claim 17 wherein said film comprises a material selected from the group consisting of silicon oxide, aluminum oxide, tantalum oxide, tungsten oxide, magnesium fluoride, and calcium fluoride.

* * * * *